A. O. ABBOTT, Jr.
ATTACHMENT FOR MIXING MILLS.
APPLICATION FILED APR. 26, 1920.

1,405,383.

Patented Feb. 7, 1922.
2 SHEETS—SHEET 1.

WITNESSES:
Earl H. Dickman
Stuart M. Spice

INVENTOR
Adrian O. Abbott Jr.
BY
Ernest Hopkinson
ATTORNEY

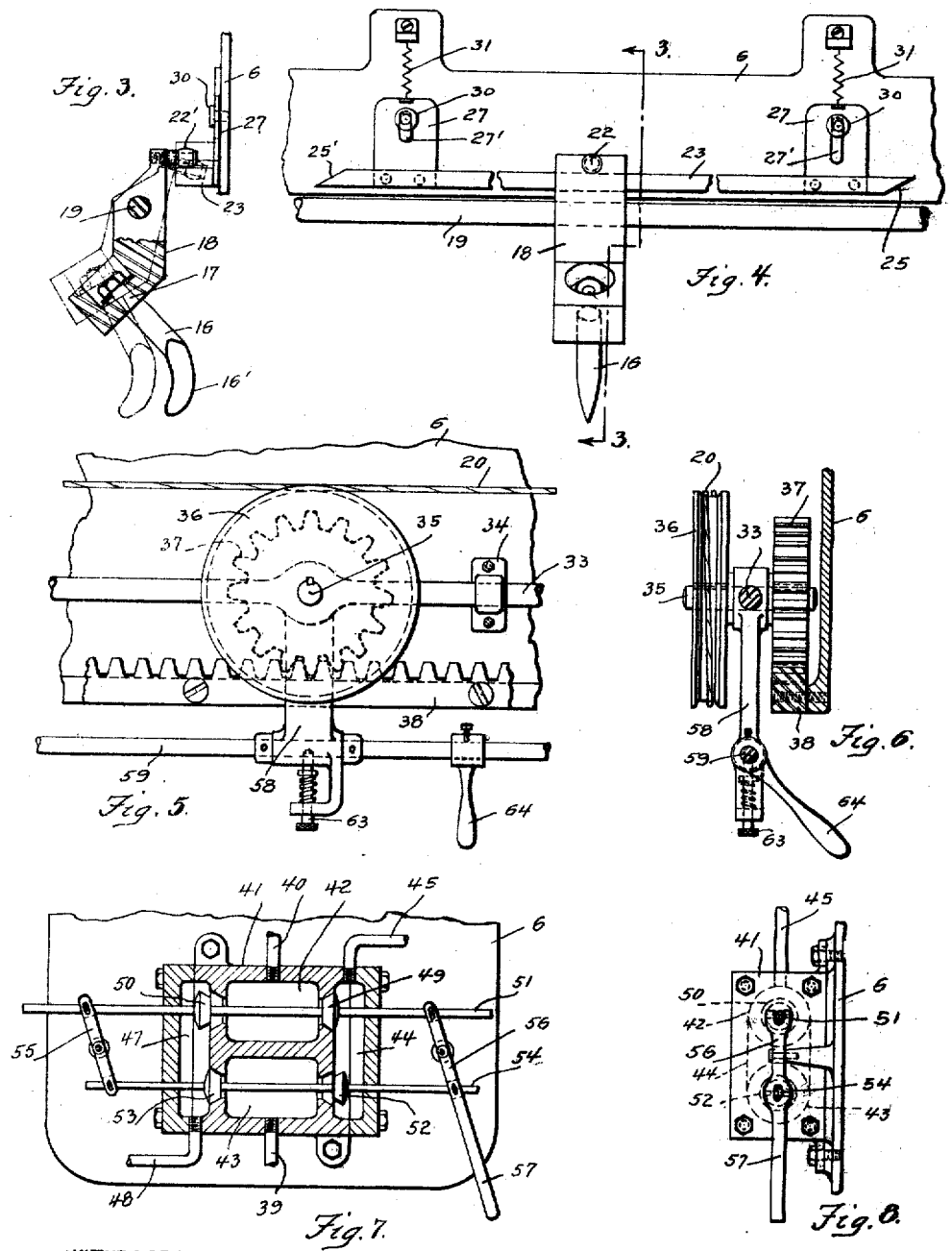

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

ATTACHMENT FOR MIXING MILLS.

1,405,383.  Specification of Letters Patent.  Patented Feb. 7, 1922.

Application filed April 26, 1920. Serial No. 376,521.

*To all whom it may concern:*

Be it known that I, ADRIAN O. ABBOTT, Jr., a citizen of the United States, residing at Detroit, in the county of Wayne and State of Michigan, have invented certain new and useful Improvements in Attachments for Mixing Mills, of which the following is a full, clear, and exact description.

This invention relates to an attachment for mills and more particularly to a device for shifting a plastic composition to thoroughly mix its ingredients.

Ingredients for mixing rubber composition are usually incorporated into a more or less homogeneous mass between two horizontal spaced rolls around one of which a sleeve of the plastic material usually forms. To expedite and homogenize the mixture of the ingredients, it is usual to slit the sleeve crosswise and fold or roll back a margin of the slit towards the middle of the roll first at one side and then on the other side of the roll. By alternately slitting and rolling back portions of the plastic material towards the center the desired mixing of the ingredients is obtained more quickly and better than would otherwise be the case. For convenience this operation may be termed "working" the plastic material.

After the ingredients are thoroughly mixed or "worked" the plastic material is removed in slabs by cutting quickly inward from the edge of the roll, holding the knife stationary intermediate the ends of the roll, gripping an end of the strip or slab that is then formed as the rolls revolve until the desired length of slab is obtained, when a quick cut back to the edge of the roll severs the slab completely. After the sleeve reforms it is again "slabbed," and so on until the roll is completely cleared when another batch of ingredients is supplied to it. The cutting operations involved in removing the rubber sleeve may for convenience be termed "slabbing."

Heretofore the working and slabbing operations have been done manually by an operator, with a short blunt knife, which required considerable strength and dexterity to manipulate. The cutting involved is dangerous as the operator may lose his balance and be drawn between the rolls. Not infrequently operators are permanently maimed in this way.

The present invention aims to provide an attachment for mixing mills by which the "working" and the "slabbing" operations may be performed without as great liability to permanent injury as in the hand cutting heretofore practiced. More specifically it aims to provide a cutter that may be moved automatically to effect the "working," or at will, to effect the "slabbing." Still further it contemplates a more efficient and improved construction, saving the operator's time and energy and permitting him to attend to a number of mills. Also it aims to remove or reduce the hazard heretofore attending the operation of a mill and to avoid the necessity of standing over the mills and breathing obnoxious fumes given off during the mix. And comprehensively it has for an object a new and novel combination and arrangement of a mill and an attachment therefor by which thorough mixing of compounding ingredients may be performed automatically.

With the specific form of the invention illustrated in the drawings in mind, the invention may be described briefly as consisting of cooperating and driven rolls crosswise of one of which a knife is reciprocated automatically to cut the sleeve of rubber alternately from the sides toward the center where it is elevated to clear the sleeve of rubber for the remainder of its reciprocation. The knife may, however, be shifted from one side toward the center, then held stationary, and finally returned to the side whence it started, to slab off the material. The knife is slidably supported on a rod and reciprocated by an endless belt to which it is attached, the belt being driven first in one direction and then in the other. Cams are arranged in cooperating relation with a portion of the knife so as to intermittently swing it on its support toward and from the surface of a roll. A recessed block at each edge of the roll clears the rubber from the margin thereof so that the knife may drop back to a position substantially in contact therewith for starting its inward cut, and the front portion of this block serves to shift or roll back a portion of the rubber that has been slit, thereby moving it towards the middle of the roll for reworking.

A preferred embodiment of the invention is illustrated in the accompanying drawings in which—

Fig. 3 is a cross-section on the line 3—3 Fig. 4;

Fig. 4 is a front elevation of a knife block and cooperating cam bar for swinging it, viewed in front elevation;

Figs. 5 and 6 are elevations and sections respectively of a cable sheeve and pinion drive therefor;

Figs. 7 and 8 are sections and elevations respectively of a valve block and control levers therefor.

Figure 1:
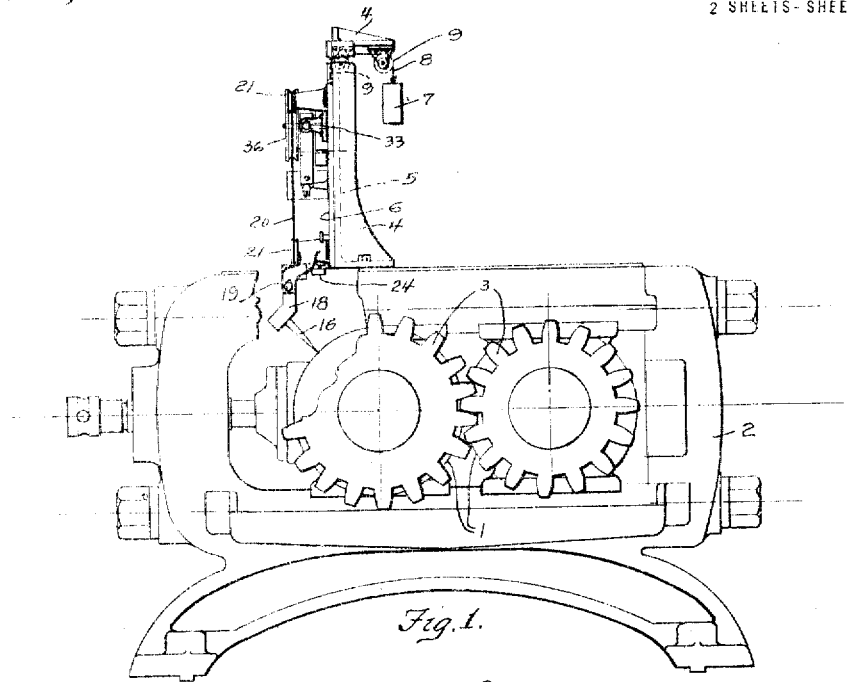
Figs. 1 and 2 are side and front elevations respectively of a mixing mill with the attachment mounted in working position thereon.

The invention is illustrated in the drawings in combination with a mixing mill of well known form comprising spaced horizontal rolls 1 journaled in standards or side housings 2 and provided with intermeshing gears 3, the shaft of one roll being driven in any suitable manner.

Spanning the standards or side housings 2 and bolted thereto is a frame 4 of inverted U-shape, in vertical guideways 5 in the sides of which is mounted a slide-frame 6. A counter weight 7 is connected to the top of the slide frame by a rope 8 passing over pulleys 9. By removable pins 10 at each side, the slide-frame 6 may be held in either the lowered position shown in Fig. 2 or raised.

At opposite ends of the forward roll recessed blocks 11 are mounted contiguous its face. Each of these blocks keeps a small marginal portion of the roll within its recess 12 clear of the plastic material 13 which forms in a sleeve about the forward roll, it being understood that in the operation of the rolls the plastic material spreads gradually from the center towards the ends of the roll in forming itself into a sleeve. The forward edges of the blocks 11 are curved as shown at 14 and preferably next to the roll are provided with a thin lip 15. The lip 15 lies close to the roll and inserts itself under the plastic sleeve while the edge 14 shoulders or deflects the material from one side of the roll toward its center.

A knife 16, bent as shown in Fig. 3 to present a blunt or rounded cutting edge 16' to the surface of the roll, has its reduced end 17 loosely swiveled in a block 18 which is slidably mounted on rod 19 supported at its opposite ends by suitable brackets fixed to slide frame 6. The upper portion of block 18 is secured in any convenient manner to a cable or endless belt 20 encircling pulleys 21 located at the four corners of the slide-frame. And by this belt the block is adapted to be pulled back and forth across the surface of the roll from one to the other of the recesses 12 in the blocks 11 at opposite ends of the roll.

Rearwardly of the knife block 18 extends a pin 22 carrying an anti-friction roll 22' which is adapted to track sides of two separate bars 23—24, each of which has its ends beveled in parallelism, but at an inclination opposite those of the other as indicated at 25—25' and 26—26' respectively. The bar-cams 23—24 are secured to pairs of spaced plates 27 and 28 which are provided with slots 27' and 28'. The slots in the plates near the contiguous ends of the two bars 23—24 are longer than those in the plates near the remote ends of the two bars. Headed pins 30 passing through the slots confine the plates slidably against the frame 6 and springs 31 are provided to yieldingly support the plates and their bars with the contiguous beveled ends of the latter normally elevated slightly above their remote ends as illustrated by bar 24 which is shown in its normal position.

As the knife block 18 is pulled to the right across the face of the forward roll the roller 22' rearward thereof rides on top of the bar 23 and holds the knife contiguous or substantially in contact with the forward material roll until the left hand beveled end of the bar 24 engages and depresses the roller 22' to swing the cutting edge 16' away from the surface of the roll and out of the material sleeved thereabout. As the knife continues its movement it is held clear of the material by the underside of bar 24 for the remainder of its stroke and until it enters the recess 12 in the deflecting block 11 when it swings by gravity down against or close to the clear face of the roll within the recess. In moving to the left the operations are repeated the knife cutting and then clearing the sleeve on the roll in the first and last portions respectively of its stroke.

Figure 2:
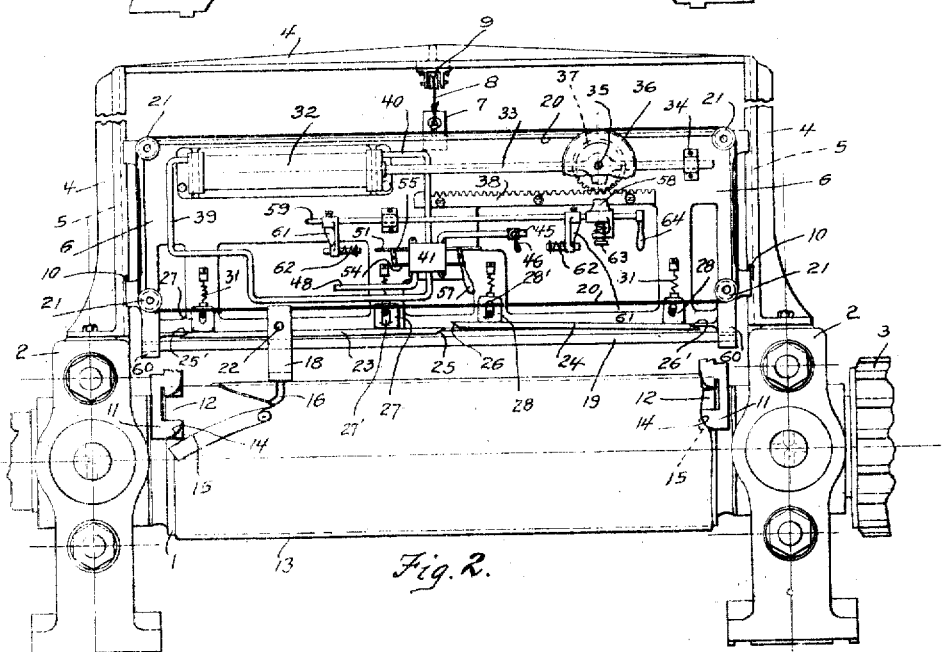

The cams or bars 23—24 and cable 20 thus move the cutting portion of the knife in an endless path crossing itself like the numeral 8, riding on top of bar 23 and underneath bar 24 when moving to the right as viewed in Fig. 2, and riding on top of bar 24 and underneath bar 23 on its return stroke in the opposite direction. The recesses 12 in the blocks insure severance of the plastic material from the edges inward. The plastic sleeve about the roll is thus alternately slit on opposite sides of the roll inwardly from its edges. As the knife moves inward to slit the plastic sleeve to a point in the vicinity of the middle of the roll, the material, which turns with the material roll, is folded or coiled upon itself by the abutment or shoulder 14 as indicated in Fig. 2 of the drawings.

Any suitable means may be employed to reciprocate the knife block 18 instead of cable or belt 20. The latter has, however, been found suitable and it may be operated by fluid pressure, air or water, but preferably air, supplied to the double cutting cylinder 32 whose piston rod 33 is steadied in bracket 34, and loosely supports a shaft 35. Keyed to the shaft 35 on opposite sides of the piston rod is a sheeve 36, about which the cable or belt is looped and a pinion 37 of smaller diameter than the sheeve. The pinion 37 in mesh with a stationary rack 38 fixed to the slide-frame 6 is rotated first in one direction and then the other as the piston rod is reciprocated back and forth and likewise of course to sheeve 36.

Air or other suitable fluid is passed to and from opposite ends of the cylinder 32 through the pipes 39 and 40 from a valve chest 41 having chambers 42 and 43 with suitable ports to a chamber 44 which may be supplied with fluid under pressure through a pipe 45 having a valve 46. A chamber 47 at the opposite side of the chest and in communication with the chambers 42 and 43 is vented through an exhaust pipe 48. Valves 49 and 50 are mounted in suitably spaced relation on a rod 51 for admitting and exhausting air through the ports in the chest 41 to and from the right hand end of the cylinder 32 while similar valves 52 and 53 on a rod 54 govern the admission and exhaust of fluid from the left hand end of the cylinder. The rods 51 and 54 are connected by pivoted levers 55 and 56 so that the pairs of valves thereof may be operated to admit air to either end of the cylinder while the other end is in communication with the exhaust pipe 48.

Automatic actuation of the knife may be effected in any desired manner but preferably as shown through a depending bracket 58 apertured to receive a rod 59 which is slidable in a guide bracket 60 attached to the slide-frame 6. Arms 61 fixed to the rod 59 are provided with yielding contacts 62 for engaging the extremities of the valve rod 51 to reverse the action of the piston in cylinder 32 when the cutter reaches the ends of its stroke within the recesses 12 of the deflecting blocks 11 at opposite ends of the rolls.

The valves may be governed manually, however, by a handle 57 on one of the levers, as is desirable for slabbing off the thoroughly mixed rubber, by throwing the contacts 62 out of the path of rod 51. For this purpose rod 59 is adjustably secured to hanger 58 by a spring operated detent 63 engageable in either of two sockets in the rod 59, to one end of which rod a hand crank 64 is fixed.

In operation, after a batch of the compounding ingredients has been mixed enough to form a sleeve about the forward roll, the operator removes the pins 10 then holding the slide frame up and the knife in a nonobstructing position, and lowers the slide frame which may be held down by insertion of the pins 10. Through valve 46 air or other suitable fluids is then supplied to the valve chest 41 and alternately to opposite ends of the cylinder 32 through the mechanism described above in detail. As the piston rod 33 is reciprocated the cable 20 looped about the sheeve 36 is rotated in opposite directions and the knife block 18 and cutting tools 16 reciprocated back and forth. In moving to the right, as viewed in Fig. 2, the knife block 18 is held substantially in contact with the surface of the roll by the upper side of bar 23 which then supports the anti-friction roller 22' located rearward of the knife block. As the knife block continues its motion to the right the roller 22' encounters the beveled surface 26 and passes beneath the bar 24 thereby swinging the cutting portion 16' of the knife from the position shown in solid lines in Fig. 3 to that shown in dotted lines therein. Thus intermediate the ends of the roll the inward slitting of the rubber sleeve is interrupted. The knife continues on, however, passing above and clear of the rubber sleeve until it enters the recess 12 in the block 11 at the opposite side of the roll. There the cutting portion 16' moves down into contact with the surface of the roll kept clear by the forward shoulder 14 on the block 11 and in this turning movement of the block 18 the roller 22' is elevated. Movement of the knife block 18 to the left as viewed in Fig. 2 carries the roller 22' over the top of bar 24, whose left hand end is free to move down by reason of the relatively long slot 29' adjacent thereto, until it encounters the beveled end 25 of the bar 23 which is normally held by its adjacent spring 31 at an elevation obstructing travel of the roller 22'. The latter engages the inclined surface 25 and is depressed so that the knife has its cutting portion 16' carried clear of the rubber sleeve on the forward roll and in the continued movement of the block 18 to the left the knife is held clear of the material.

While the construction described above in detail is preferred, many changes and variations may be made within the principles underlying the same. Broadly, the invention comprehends working the plastic composition sleeved about the forward roll towards the center thereof by a cutter that is movable by mechanical devices from side to side of the roll. Obviously the slitting may be performed from the center to the edges instead of from the edges to the center. Though the latter is preferred, the former may be found desirable for mixing plastic compositions. Further the attachment may be duplicated to simultaneously effect cutting at the margins of the rolls by employing two oppositely moving knives. In view of the scope of the invention as it is at present understood, reference should, therefore, be made to the accompanying claims.

Having thus described my invention what I claim and desire to protect by Letters Patent is:

1. A mill for plastic material having co-operating rolls, and means for rotating the rolls, in combination with means for severing and folding the material whereby it may be advantageously reworked.

2. A mill for plastic material having co-operating rolls, and means for rotating the rolls, in combination with means for simultaneously cutting and folding the material toward the center of the rolls.

3. A mill for plastic material having co-operating rolls, and means for rotating the rolls, in combination with a cutting member operatively supported contiguous one roll, and means for moving said member transversely of a roll while supported contiguous thereto.

4. A mill for plastic material having co-operating rolls, and means for rotating the rolls, in combination with a cutter movable in a prescribed path contiguous one roll, means for moving said cutter, and means for clearing the material from the cutter at one end of its path of movement.

5. A mill having cooperating rolls, and means for rotating the rolls, in combination with a parting tool, and means for moving the parting tool back and forth across the roll in an irregular non-rectilinear path whereby material being mixed and tending to spread to the sides may be returned to the middle of the rolls for reworking.

6. A mill having cooperating rolls, and means for rotating the rolls, in combination with a cutter, means for reciprocating the cutter transverse one of said rolls, means for maintaining the cutter in contact with a roll for a portion of its transverse reciprocation and for shifting it from contact at a point centrally of the roll, and means for deflecting the material after it is cut.

7. A mill having cooperating rolls, and means for rotating the rolls, in combination with a cutter, and means for moving the cutter transversely of a roll and toward and from its axis whereby material may be cut and shifted alternately from opposite edges toward the center of the roll, and abutments adjacent the edges of the rolls for shifting the material.

8. A mill for fixing plastic material having cooperating rolls, and means for rotating the rolls in combination with, a tool having a cutting portion, means for moving the cutting portion of the tool in an endless path, and means for shifting the material cut toward the middle of the surface of the rolls.

9. A mill for mixing plastic material having cooperating rolls, and means for rotating the rolls in combination with, a tool having a cutting portion, means for moving the cutting portion of the tool in an endless path, and means for shifting the material cut toward the middle of the surface of the rolls, said tool moving means including devices for moving its cutting portion toward and from the axis of a roll.

10. A mill for mixing plastic material having cooperating rolls, and means for rotating the rolls in combination with, a tool having a cutting portion, means for moving the cutting portion of the tool in an endless path, and means for shifting the material cut toward the middle of the surface of the rolls, said tool moving means including members with surfaces inclined to an axis of a roll and inclined opposite each other in front and at the center of a roll.

11. A mill for mixing plastic material having cooperating rolls, and means for rotating the rolls in combination with, a tool having a cutting portion, means for moving the cutting portion of the tool in an endless path, and means for shifting the material cut toward the middle of the surface of the rolls, said tool moving means including members arranged in a plane and having cam portions adjacent the ends and middle of a roll.

12. A mill for mixing plastic material having cooperating rolls, and means for rotating the rolls in combination with, a tool having a cutting portion, means for moving the cutting portion of the tool in an endless path, and means for shifting the material cut toward the middle of the surface of the rolls, said tool moving means including an endless driving member attached to the tool and cooperating means for intermittently shifting the tool relative to the face of the roll.

13. A mill for mixing plastic material having cooperating rolls, and means for rotating the rolls in combination with, a tool having a cutting portion, means for moving the cutting portion of the tool in an endless path, and means for shifting the material cut toward the middle of the surface of the rolls, said tool moving means including shiftable bars with beveled ends, and means on said tool cooperating with said bars to vary the position of the cutting portion thereof relative to the surface of the roll.

14. A mill having cooperating rolls, and means for rotating the rolls, in combination with, a cutter, means supporting the cutter for movement from one side to the other of the roll, means for moving the cutter in a predetermined path intermittently into a position contiguous one of the rolls, means at the side of the roll for clearing the material therefrom for the reception of a cutter, and means for shifting the material when cut towards the middle of the surface of the roll.

15. A mill having cooperating rolls, and means for rotating the same, in combination with, a frame adjustable towards and from the axis of a roll, and means movable on said frame for cutting material which forms in a sleeve thereabout.

16. An attachment for mixing mills including in combination, a cutter, means supporting said cutter for movement in a predetermined path, means for moving said cutter in said path and including an endless belt, means for driving said belt in opposite directions, a plurality of bars with oppositely inclined ends, and means operatively connected to said cutter and cooperating with said bars whereby one portion of the cutter at least may be moved in a crossed endless path.

17. A mill having cooperating rolls, and means for rotating the same, in combination with, a cutter, a slidable hinged support for said cutter, means for sliding said cutter on its support including a fluid pressure device, valves for admitting and exhausting fluid from said device, automatic means for governing the action of said valves, and means cooperating with a part of the cutter to swing it on its pivot while being reciprocated.

18. A mill having cooperating rolls, and means for rotating the same, in combination with, a cutter, a slidable hinged support for said cutter, means for sliding said cutter on its support including a fluid pressure device, valves for admitting and exhausting fluid from said device, automatic means for governing the action of said valves, and bar cams in the path of a portion of said cutter for swinging the latter toward and from the surface of a roll.

19. A mill having cooperating rolls, and means for rotating the rolls in combination with, a knife carrying block, means slidably supporting said block and permitting movement thereof from one side to the other of the roll, said last named means including an endless belt, a sheeve about which the endless belt is looped, and means for turning the sheeve intermittently in opposite directions or holding it stationary whereby plastic rubber sleeved about the forward mill roll may be cut in slabs therefrom by power.

20. A mill having cooperating rolls, and means for rotating the same, in combination with, a cutter, a slidable hinged support for said cutter, means for sliding said cutter on its support including a fluid pressure device, valves for admitting and exhausting fluid from said device, and means for governing the action of said valves.

21. A mill having cooperating rolls, and means for rotating the rolls in combination with, a knife carrying block, means supporting said block for movement crosswise of one of said rolls, and means for moving said block from side to side or part way across the surface of the roll, as desired.

Signed at Detroit Mich., this 14th day of April, 1920.

ADRIAN O. ABBOTT, JR.